Nov. 16, 1965  J. DOLZA  3,217,699
VALVE ACTUATION MECHANISM
Filed April 20, 1964  4 Sheets-Sheet 1
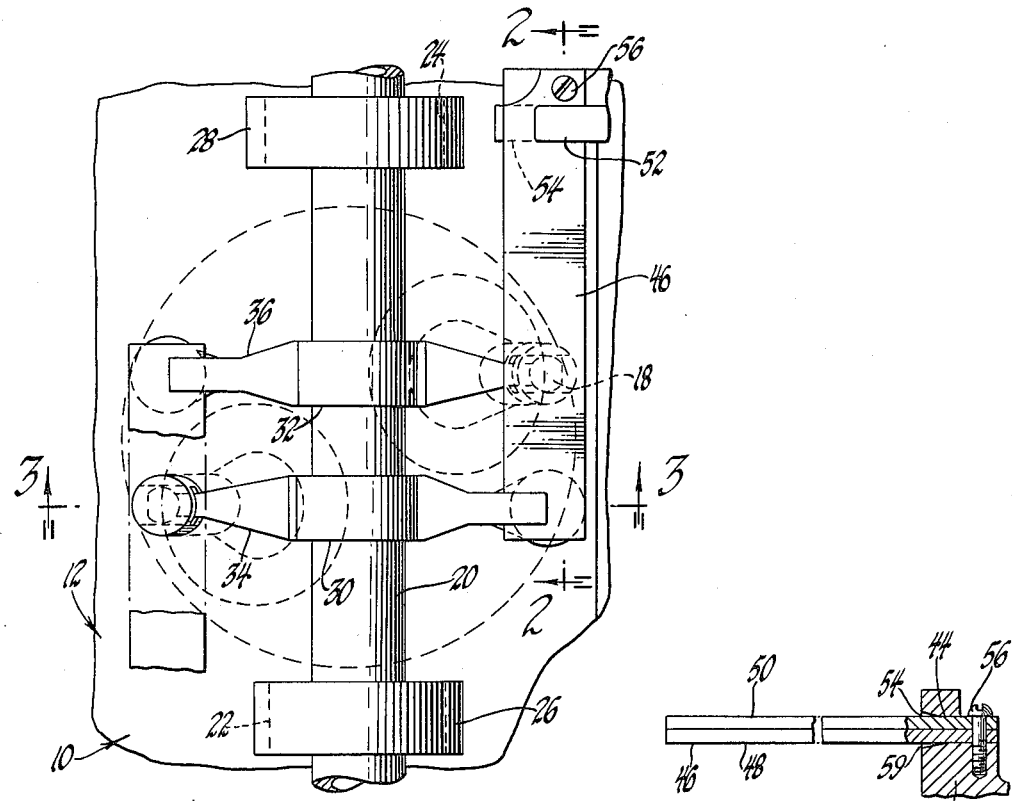
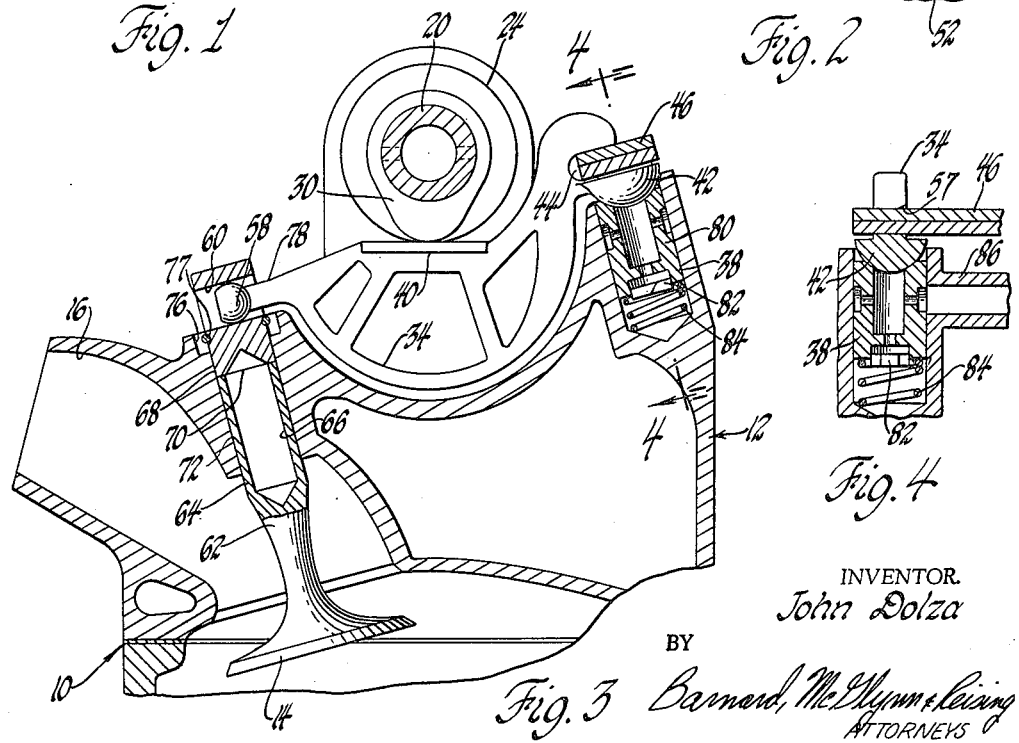
INVENTOR.
John Dolza
BY
Barnard, McGlynn & Reising
ATTORNEYS

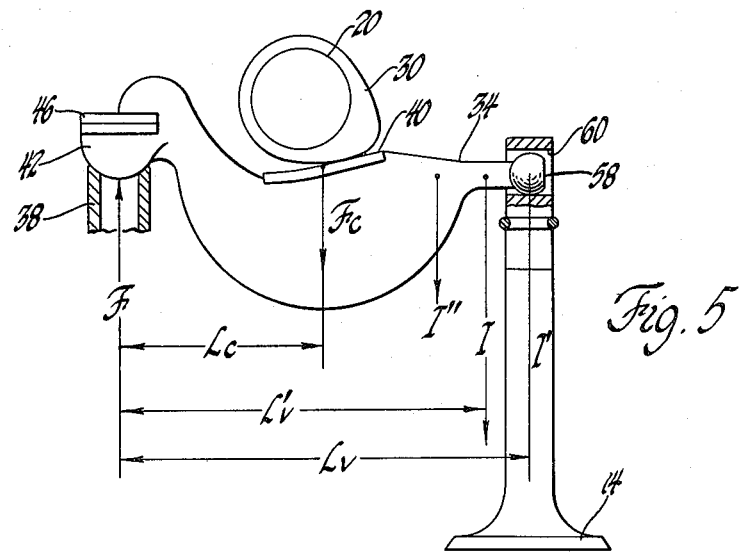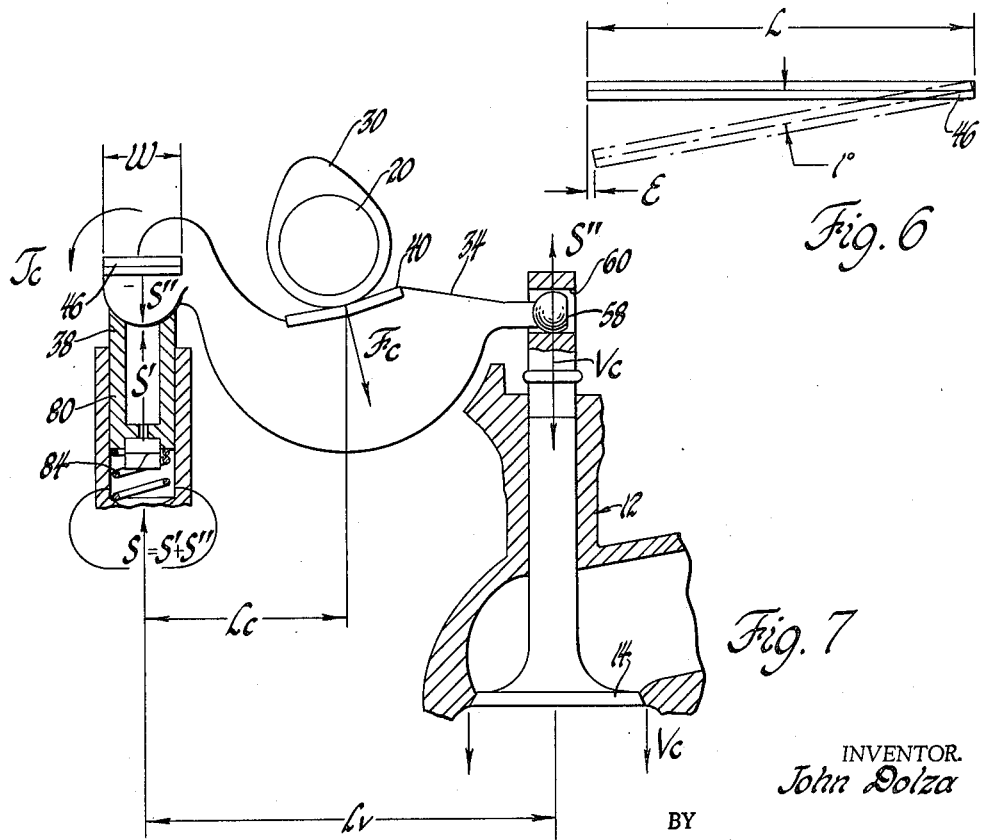

Nov. 16, 1965　　　　J. DOLZA　　　　3,217,699
VALVE ACTUATION MECHANISM
Filed April 20, 1964　　　　4 Sheets-Sheet 4

INVENTOR.
John Dolza
BY
Barnard, McGlynn & Reising
ATTORNEYS

United States Patent Office 3,217,699
Patented Nov. 16, 1965

3,217,699
VALVE ACTUATION MECHANISM
John Dolza, 810 State St., Fenton, Mich.
Filed Apr. 20, 1964, Ser. No. 361,100
31 Claims. (Cl. 123—90)

This invention relates to valve actuation mechanisms and more particularly to a valve actuating mechanism for use with an internal combustion engine having intake and exhaust valves.

In the design and manufacture of internal combustion engines, there is normally provided a camshaft which is operated at a proportional speed from the engine crankshaft and which in turn drives a series of valves, both intake and exhaust, for operation of the engine. The camshaft is normally located longitudinally of the engine and is provided with connecting means between a series of cams located thereon and the intake and exhaust valves. One of the major aims of engine design is to produce a smaller engine for a given power without sacrificing low speed torque, smoothness, fuel economy, optimum idle, and low hydrocarbon exhaust emission. It is desirable to provide a valve operating mechanism capable of operating large valves at high lift to permit good engine breathing at high and low speeds, thus making it possible to achieve these advantages. In operation, the valve operating mechanism requires that acceleration and deceleration of its parts in opening and closing the valves is in accordance with the desired timing. Since the forces of acceleration and deceleration are proportional to the amplitude of movement and to the masses involved, as well as to the square of the revolutions per minute of the engine, the design of the valve operating mechanism must take these factors into consideration.

In the past, the first step taken by designers to achieve this goal has been in mounting the camshaft of the engine on the cylinder head and thus reducing the masses of the engine and valve actuation mechanisms by the elimination of the usual push rods and associated parts. Numerous other designs have been added to this, which include: the use of torsional springs in the valve actuation mechanism which greatly reduce the effectiveness of the spring mass. Another attempt has been to utilize the desmodromic valve mechanism, which contemplates the use of a double cam providing positive opening and closing of the valve in its operation. Such designs as these have serious drawbacks since, for example, the torsion spring proposed is extremely costly and mechanically unreliable; and neither the torsion spring nor the desmodromic scheme provides a practical solution to the problem of hammering or shock caused by the clearance between valve stems and rocker arms and the shock at the twin cam in relation to other parts of the valve mechanism. Furthermore, these designs do not make provision for automatic lash adjusters, or for operation at high speed at which inertia forces opposing the valve springs may momentarily exceed the latter and permit the lash adjuster to maintain the valve in its open position at high speeds. Such a condition as this is normally called "pump up."

It is here proposed to provide a valve operating mechanism which includes a leaf-type torsion spring mounted on the cylinder head and extending along an axis substantially parallel to the camshaft. The torsion spring is connected to a rocker arm which extends laterally of the engine and between a lash adjusting device and the stem of either the intake or the exhaust valve. The rocker arm is so disposed that the camshaft cam acts on the center of the rocker arm, thus causing the rocker arm to pivot about the end to which the torsion spring is attached. The connection between the opposite end of the rocker arm and the intake or exhaust valve is in the form of a ball joint to permit optimum movement and force transmission between the rocker arm and the valve stem.

An engine design formed in accordance with the above brief description provides numerous advantages over presently available engine designs. Such mechanism provides a control over shock and noise in the valve mechanism. Because of the construction of the valve mechanism, there is a considerable saving in weight or mass over presently available engine designs as well as a possibility of lowering the engine camshaft and thus creating a reduction in overall size of the engine. The particular construction permits a control over pump up in the lash adjustment mechanism and permits advantage to be taken over such pump up to provide engine governing or speed limitation as desired.

These and other advantages will become more apparent from the following description and drawings in which:

FIGURE 1 is a plan view of a portion of an engine illustrating the camshaft, rocker arms, and one of the rocker arm actuating springs adjacent one of the engine cylinders.

FIGURE 2 is a partial cross sectional view of a portion of the engine illustrated in FIGURE 1 taken substantially along the line 2—2 of FIGURE 1 and looking in the direction of the arrows to illustrate the mounting of the torsion spring.

FIGURE 3 is a cross sectional view of a portion of the engine illustrated in FIGURE 1 taken substantially along the line 3—3 of FIGURE 1 and looking in the direction of the arrows.

FIGURE 4 is a partial cross sectional view of the engine illustrated in FIGURES 1 and 3 taken substantially along the line 4—4 of FIGURE 3 and looking in the direction of the arrows to indicate the position of the various parts.

FIGURE 5 is a schematic view of the valve operating mechanism showing the valve in an open position to illustrate various of the inertia forces thereon.

FIGURE 6 is a schematic view of the torsion spring illustrated in FIGURES 1 through 4 to show the manner in which the spring moves with the operation of the valve mechanism.

FIGURE 7 is a schematic view of the operating mechanism of FIGURES 1 through 4 illustrating the valve in the closed position.

Figure 8:
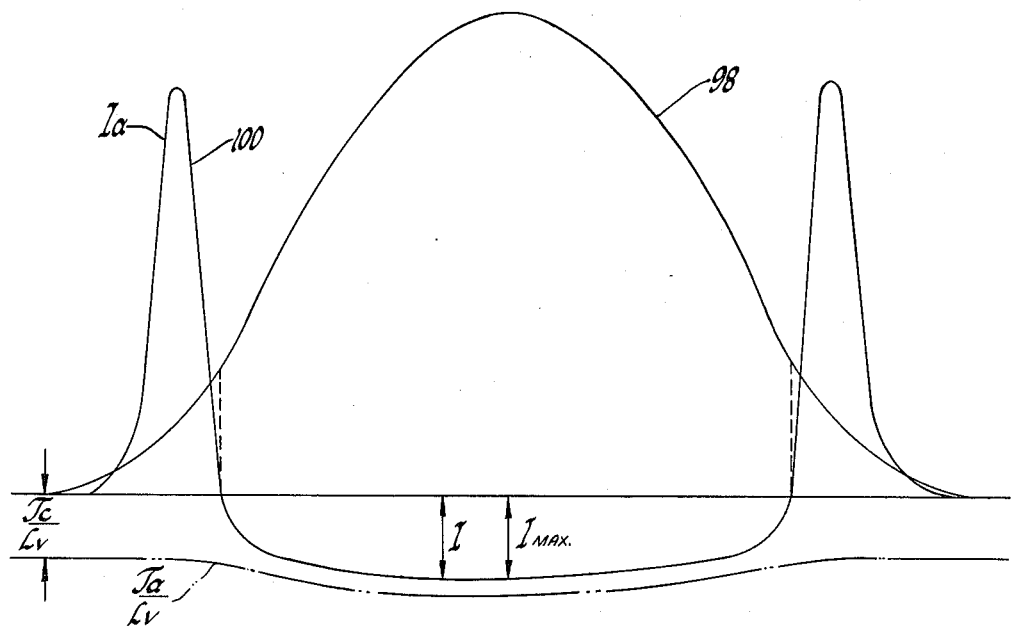
FIGURE 8 is a graph showing the valve lift curve and the valve acceleration curve, with the degree of camshaft rotation on the abscissa, and the ordinate including both distance and acceleration.

Referring more particularly to the drawings, FIGURES 1 through 3 best illustrate the internal combustion engine embodying the valve operation mechanism. The engine is of the type having a cylinder head, illustrated generally by the numeral 10, which is disposed over a plurality of cylinders in which operate the usual pistons and other mechanism for driving the crankshaft. The cylinder head 10 includes intake valves 14 disposed in branches 16 of an intake system leading from the carburetor and intake manifold, and communicating with the cylinder 12. Similarly, exhaust valves 18 are mounted in the cylinder head 10 and provide communication between the cylinder 12 and the exhaust system of the engine. Disposed above the cylinder 12 and over the cylinder head 10 is a camshaft 20, journalled as at 22 and 24 within the mounting flanges 26 and 28, respectively. Camshaft 20 is provided with the usual cams 30 and 32 mounted in spaced pairs along the length of the camshaft 20 for actuation of the intake and exhaust valves 14 and 18, respectively.

Cams 30 and 32 actuate pairs of rocker arms 34 and 36, respectively, one of each pair being connected to an intake valve 14 and the other being connected to an exhaust valve 18. Since the rocker arms 34 and 36 are substantially the same, only one will be described in detail. Rocker arm 34 is a beam-like member extending from a lash adjusting mechanism, illustrated generally by the numeral 38 at one end and the stem of valve 14 at the other. The rocker arm passes beneath the camshaft 20 adjacent one of the cams 30 and is provided with a shoe or pad 40 intermediate the ends thereof which is engaged by the cam 30. The end of rocker arm 34 engaging the lash adjustment mechanism 38 is provided with a spherical seating surface 42 which forms the fulcrum for the rocker arm and about which the rocker arm rotates as it is actuated by the cam 30.

The end 42 of rocker arm 34 is provided with a slot 44 which receives the end of a laminar torsion spring, illustrated generally by the numeral 46, and which may be formed of two rectangular sections 48 and 50, as illustrated in FIGURE 2, or any other elastically equivalent section. Spring 46 is received in the slot 44 in the spherical end 42 of the rocker arm 34 and extends longitudinally of the engine to a suitable mounting pad 52 formed on the cylinder head in any convenient manner. A slot 54 in the pad 52 receives the spring 46, as illustrated in FIGURES 1 and 2, and a pin 56 received in suitable holes in the spring 46 and in the pad 52 retains the spring from longitudinal movement, as will become hereinafter more apparent.

Spring 46 is rotationally resilient about its longitudinal axis and provides a torque transmitting coupling to bias the rocker arm 34 into its proper position. It is desirable that the axis of spring 46 be concentric with the axis of the spherical end 42 of rocker arm 34 to provide optimum movement. Spring 46 rotates along its axis in such a manner as to bias the rocker arm 34 against the cam 30 and thus provide the return motion of the rocker arm after it is engaged by the nose of the cam.

Since the twisting action of the spring 46 causes a spiraling of the edges thereof, a slight bell mouthing of the slot 44, as at 57, in the rocker arm 34 and a similar bell mouthing 59 in the slot 54 of the pad 52 is desirable. Also, a low friction coefficient between the rocker arm slot 44 and the surfaces of the spring 46 is desirable to permit a slight amount of sliding between the spring and the rocker arm and thus accommodate movements of the lash adjusting assembly 38.

The opposite end of rocker arm 34 engages the stem of intake valve 14 or, in the case of rocker arm 36, the exhaust valve 18. Rocker arm 34 terminates in a spherical portion 58 which is received in a bore 60 formed transversally of the axis of valve stem 14. Such a construction permits good manufacturing control of hole size, roundness, taper, hardness, and smoothness, and the same control can be achieved for the ball portion 58. Thus, it is possible to control the play between ball 58 and the bore 60 within very close limits. For example, an amount of approximately 0.0005 of an inch is readily achieved. With this control it is possible to provide adequate control of the shock and noise that otherwise could result, particularly in proximity of the acceleration reversal of the valve mechanism.

Since a fairly large spherical end 58 is necessary to limit the stresses between the ball 58 and the bore 60 to a safe value, it is desirable to increase the diameter of the valve stem 62 over the conventional valve construction. For this purpose, the enlarged portion 64 may be provided with a longitudinal bore 66 to lessen the weight of the valve stem, and an upper portion 68 containing the transverse bore 60 is attached in any suitable manner, as by welding at 70 to the enlarged portion 64. The large stem permits reduction in the overhang of bore 60, as compared to the valve guide portion 72 of the cylinder head 10, and the cocking moment caused by friction of the ball 58 moving in the bore 60 and their lever arms in relation to the outer end of valve guide 72 will be minimum. Thus, the length of valve guide 72 can be made considerably shorter than is conventional practice, simplifying the casting of the cylinder head and lowering the camshaft and its supports 26 and 28. Similarly, this permits a lowering of the lash adjuster mechanism 38 and its supporting portion of the cylinder head 10 to further reduce the size, weight, and cost of the engine.

Figure 11:
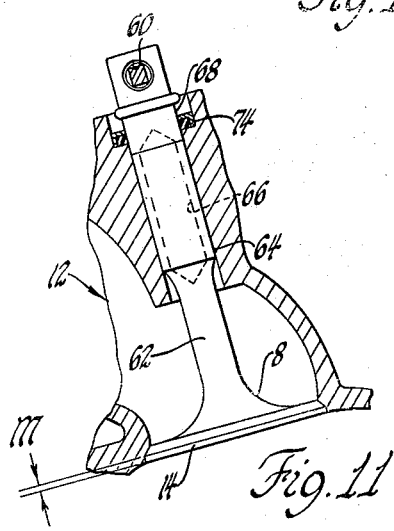
FIGURE 11 is a partial cross sectional view of the engine illustrated in FIGURES 1 through 4 showing one of the valves in its closed position.

A suitable seal 74 may be mounted in a counter bore 76 formed in the valve guide 72, as shown in FIGURE 11, and in sliding arrangement with the valve stem 68 prevents excessive oil from being sucked through the clearance of the valve guide and into the engine cylinder 12. Additionally, a retainer ring 77 may be provided around valve stem portion 68 to limit the inward movement of the valve, as will be hereinafter more fully described.

The spherical end 58 is connected to the rocker arm 34 by a neck 78 which is smaller in diameter than the bore 60 in the valve stem. Neck 78 permits oscillation around the axes of the valve stem and permits some rotation of the valve about its axis. The combination of the spherical ends 58 and 42 of the rocker arm 34, whose centers are substantially in the median plane of shoe 40, and its actuating cam 30 permits a uniform distribution of the load between the cam 30 and the shoe 40.

At the opposite end of the rocker arm 34 is the automatic lash adjusting mechanism, indicated generally by the numeral 38. Such mechanism may be of any known type and is shown for convenience to include the usual plunger 80 closed at the lower end by a check valve 82 and biased into position by a coil spring 84. A suitable oil supply 86 communicates in the usual manner with the plunger 80. The lash adjuster mechanism will yield during the normal valve open cycle because of pressure applied by the spherical end 42 of the rocker arm 34 but will restore itself to its no-lash position when the valve is closed because spring 84 has a greater force than the opposing friction and the residual pressure caused by torsion spring 46. Although it is preferred to utilize an automatic lash adjusting device, it is apparent that a manually adjustable structure will also be operable.

In order to illustrate the operation of the valve operating mechanism, reference is now made to FIGURES 5 through 12 of the drawings. FIGURE 7 is a schematic illustration of the valve actuation mechanism to show the various forces acting on the rocker arm 34. The various forces that are of interest are illustrated in FIGURE 7 by vectors, and standard beam equations may be utilized to determine the value of these forces.

The first of these is force S, which may be defined as the return force of the spring 84 in the automatic lash adjuster 38. Force S is made up of two components, S′ being the force required to overcome the viscosity of the oil and all of the frictions in the system, including the friction at the ends of the leaf spring 46 caused by the sliding and rocking movement of the spring 46 within the arm slot 42 as the plunger moves along its axis. The distance E of movement of the spring end is illustrated in FIGURE 6 in exaggerated form. The force $S''$ is the force required to balance the torque of the torsion spring 46. Thus, the formula exists: $S=S'+S''$. The second force of interest is the valve closing force $V_c$ or seating pressure of the valve head on its seat in the cylinder head 12. Finally, the force $F_c$ is the pressure of the rocker arm 34 against the cam 30 when the valve is in the closed position.

The values of these various forces may easily be determined by standard beam formulae, and in an actual embodiment of the invention these forces have been determined as follows. The plunger 80 in the lash adjustment mechanism, because of manufacturing variations and the fact that the cylinder head and valve seat may be reworked at engine overall, moves a distance of approximately ±0.045 inch from the position at which the leaf spring is horizontal and consequently perpendicular to the plunger axis. This represents a ± movement of the spring 46. With spring 46 having a length of three inches, this will cause a sliding action E of the free end of spring 46 an amount of 0.00045 inch.

The force $S'$ may be selected at approximately ten pounds, the length $L_v$, the rocker arm length between the fulcrum and the valve, may be 5 inches and the length $L_c$, the lever arm between the fulcrum and the cam contact point, may be 2.5 inches. Thus, the valve closing force $V_c$ is found to be sixty pounds, the pressure force $F_c$ of the rocker arm is found to be twenty pounds, the torque $T_c$ of the spring 46 is found to be 350 inch-pounds, and the spring load S, when the valve is closed, is found to be approximately eighty pounds.

During the valve opening operation, the cam 30 must overcome the inertia forces of the system, the torsion spring 46 and the friction opposing the movement of the system. FIGURE 5 is another schematic illustration of the valve operating mechanism, showing the various forces and inertias in the system, such forces and inertias being represented by vectors. FIGURE 8 is a curve illustrating the resultant of the inertia forces of the system at maximum engine speed and in comparison with the valve lift curve 98.

As illustrated in FIGURE 5, the inertia of the valve mechanism can be represented by the formula: $I=I'+I''$, where I is the resultant inertia, $I'$ is the inertia force caused by valve deceleration, and $I''$ is the inertia force from the rocker arm 34. It is important to note that the resultant I is located between the cam force $F_c$ and the valve force $V_c$ and is relatively close to the valve axis. The maximum torque of the spring 46 must be enough to overcome the inertia I, at a lever arm of $L_v'$, plus the friction in the system. $L_v'$ is slightly less than $L_v$, as illustrated in FIGURE 5. Thus, the maximum torque must be equal to or greater than $L_v'$ times the maximum inertia, following the formula: $T_{max} - L_v'I$.

If it is assumed that engine speed increase above the value for which the previous equation is valid, and with reference to FIGURE 8, the new resultant of the inertia forces is illustrated by the curve 100. Labeling the new resultant of inertia forces $I_a$, it may be seen that the following formula will obtain:

$$I_a - \frac{T_a}{L_v'} - \text{friction}$$

If this point is reached, then the rocker arm 34 will separate from the cam 30 and the equation of dynamic balance may be approximated by the formulae:

$$T_a - I_a L_v' = 0$$
$$F - I_a = 0$$

where F is the fulcrum force. In these two equations friction is eliminated. These equations indicate that the fulcrum point, that is the spherical end 42 of the rocker arm 34, is still compressed by a force in the order of twice or more than the force S, and consequently pumping up of the automatic lash adjuster will be opposed by a force: $F-S'$, which stays very large, even after the rocker arm separates from the cam. Thus, the torsion spring 46 can no longer produce a force F adequate to maintain contact with the cam. This force F may be determined by the formula:

$$F = \frac{T_a}{L_v'}$$

and thus force F is approximately equal to the force of inertia $I_a$. This, of course, neglects friction.

Figure 10:
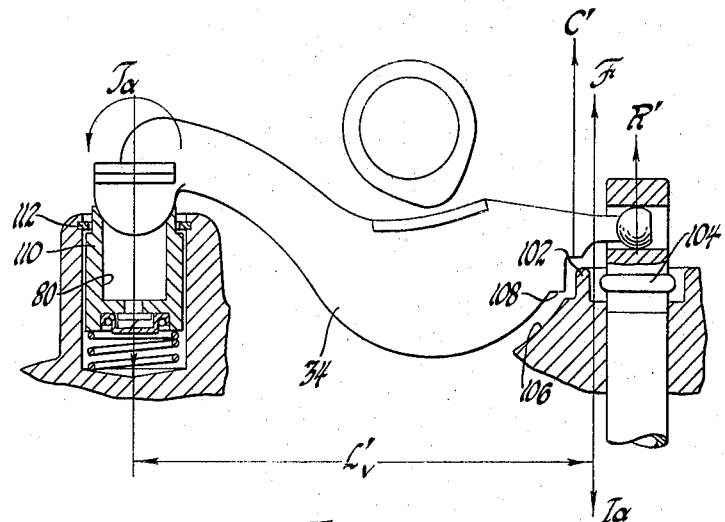
FIGURE 10 is another schematic illustration of the valve actuating mechanism showing the loads imposed on the various parts thereof.

Reference is now made to FIGURE 10 showing another schematic view of the valve operation mechanism with the rocker arm 34 separated from the cam 30 due to excessive engine speed. It may be noted that if the movement of the rocker arm lever 34 increases beyond what is shown in FIGURE 8, the rocker arm 34 may contact the cylinder head at 102 or at the retainer 77, thus developing a stopping force $C'$ which is in line with $I_a$ or at least a distance from $I_a$ quite small in relation to $L_v$, thus reducing the tendency to unload the automatic lash adjuster.

If the stop is a force $R'$ at the opposite side of the resulting force $I_a$ from the camshaft, then the effect of $R'$ adds to the reaction F on the hydraulic valve lifter.

Figure 9:
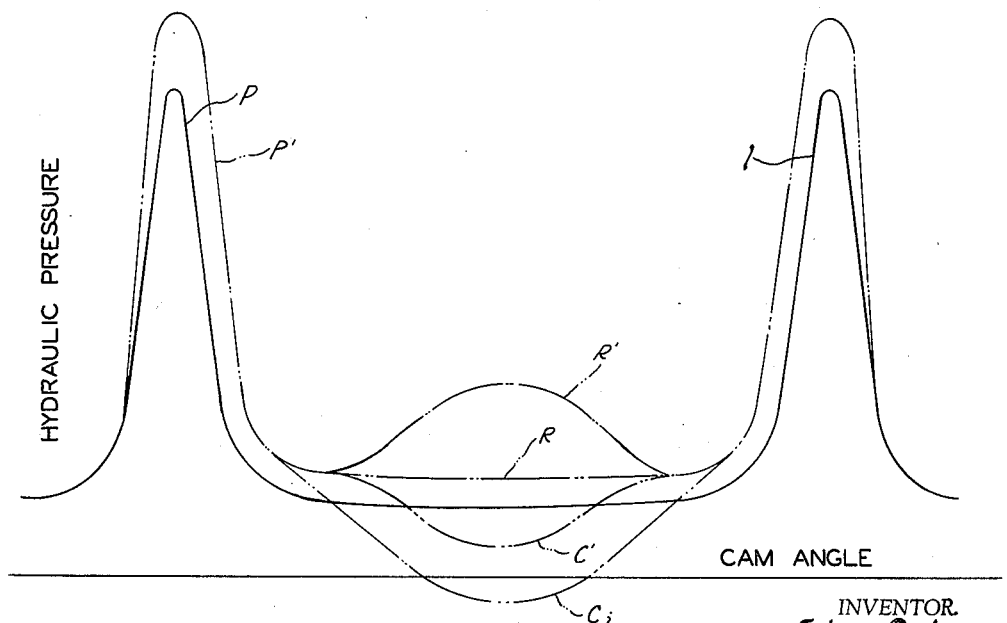
FIGURE 9 is another graph showing fulcrum pressure curves, with degree of camshaft rotation on the abscissa and pressure on the ordinate.

FIGURE 9 is a diagram illustrating the hydraulic pressure P within the fulcrum-type automatic lash adjuster when the speed of the engine is high enough to produce rocker arm separation from the cam but prior to the rocker arm hitting stop 102, or the retainer 77, hitting the stop in the cylinder head 12. As engine speed is increased until the rocker arm stop engages the cylinder head stop, the pressure within the lash adjuster will increase from P to $P'$, with no bump between the peaks as at R if the stop 102 is in line with the force of inertia $I_a$. If speed is causing the retainer 77 to hit the cylinder head 12, then curve R will rise to $R'$, causing an increase in lifter pressure. If stop 102 is located between $I_a$ and the camshaft, then $P'$ will change to a reduction of the pressure within the hydraulic lash adjusting mechanism as indicated at $C'$.

With conventional valve mechanisms the lash adjuster permits pump up of either intake or the exhaust valve. In the latter case, the exhaust valve is not completely closed when the piston reaches top dead center at the end of the exhaust stroke. The exhaust valve remains open for several degrees of crankshaft rotation past piston top dead center. Usually this is harmful since the exhaust valve burns rather rapidly.

On the other hand, it may not be objectionable to permit a small amount of intake valve opening during the compression stroke and even during the combustion and expansion strokes, as a means to prevent the engine from overspeeding beyond an unsafe value. This result may be obtained by locating on the cylinder head a stop 106, as illustrated in FIGURE 10, on the cylinder head 12 against which a corresponding stop 108 on the rocker arm 34 may engage to cause the hydraulic pressure $C'$ in FIGURE 9 within the lash adjuster to become negative in relation to the atmosphere or the oil supply pressure. This causes a small amount of pump up of the lash adjuster and unseating of the intake valve which in turn causes an automatic reduction in engine speed.

Such pump up may be limited by providing plunger 80, as viewed in FIGURE 10, with a shoulder 110 that will be restrained in its outward motion by a snap ring 112 secured in an appropriate groove in the cylinder head 12. Thus, the plunger 80 may be limited in its outward movement to control the pump up in the system.

Thus, through control of the pump up of the plunger in the lash adjustment devices, it is possible to provide a control over engine speed that may act as engine governing.

If pump up is not wanted under the various conditions of operation, it is desirable to control the system so that the fluid pressure in the lash adjuster maintains a continuous positive value along the valve lift cycle. For example, it may be desirable to assure that the pressure remains positive during the non-follow range of the cycle and that the value between the inflection points of the valve lift curve is not less than about 25 percent of the sum of the average pressure values at flank accelerations. Similarly, it may be desirable to assure that the minimum value of the pressure in this range is not less than 10 percent of the maximum pressure during flank acceleration of the valve. By thus controlling the system, optimum operation is obtained.

To improve the breathing characteristics during the intake stroke, it is necessary to open the intake valve before top dead center of the piston in the cylinder. This condition is commonly called overlap, and it reduces the engine ability to idle since it permits the exhaust to backflow into the manifold mixture. To overcome the detrimental effect of overlap, it has been the practice to require a faster engine idle, thus producing more hydrocarbon and CO affluence from the engine exhaust.

Figure 12:
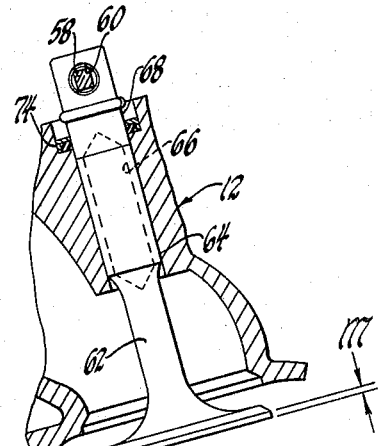
FIGURE 12 is a view similar to FIGURE 13 showing the valve in its open position.

This overlap may be overcome by masking the intake or exhaust valves as shown in FIGURES 11 and 12. The masking is equivalent to a loss of valve lift, as indicated by an amount M, the amount of masking which can be readily made up by increasing the overall lift curve as shown in FIGURE 11 from $C_2$ to $C'$. In the valve operating mechanism this increased lift is readily obtainable because of the absence of the conventional coil spring and cap which have a great tendency to surge at high speeds and high lift.

The hydraulic lash adjuster 80 must have a clearance within the guiding bore so that the receding of the plunger 80 within the bore, commonly called leakdown, during the valve lift cycle may not be too great to cause a loss of valve lift and thus noisy valve operation, even when the oil is hot and its viscosity is minimum. On the other hand, because of the possibility of good control over the pump up tendency of the lash adjuster, the minimum plunger clearance can be small when the engine is hot. Thus, by proper selection of the diameter of the plunger, it is possible to achieve a compensation for viscosity change with change in engine temperature by the clearance increase due to the expansion of the various parts. This permits the plunger of the lash adjuster to be made of extruded aluminum alloys or die cast materials greatly decreasing the cost and weight in the engine construction.

Figure 13:
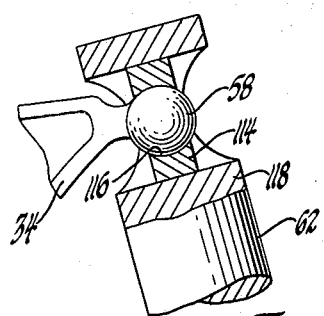
FIGURE 13 is an enlarged view of a modification of the connection between the rocker arm and the valve stem.

Referring now to FIGURE 13, a modified form of the mounting between the rocker arm 34 and the stem 62 of the valve 14 is illustrated. In this instance, the rocker arm 34 with its spherical end 58 is received in a bushing 114 which may be machined, formed, cast, or molded and is provided with a spherical groove 116 to receive the ball end 58. Bushing 114 is in turn received in a bore 118 in the end of valve stem 62 and may be slidable therein. This provides universal-type motion of the rocker arm 34 relative to the valve stem 62 for optimum movement of the valve stem 62 and valve 14 in the valve guide. If desired, lubricant may be supplied to the bushing and its mating parts in order to decrease the friction therebetween. Alternatively, the bushing 114 may be made of a material having a low coefficient of friction to aid in this purpose.

Thus, a valve operation mechanism is provided which permits control over the shock and noise normally found in valve mechanisms and which permits a considerable saving in weight and size over presently available engine designs. Control over pump up in the lash adjustment mechanism is permitted so that advantage may be taken over the pump up to provide engine governing or speed limitation as desired. Such valve operating mechanism is relatively inexpensive to manufacture and assemble and is much more efficient in its operation, thus leading to the overall efficiency of the engine as a whole.

It will be readily apparent to those having ordinary skill in the art after having had reference to the foregoing description and drawings that numerous changes and modifications may be made in the valve operating mechanism. However, it is not intended to limit the scope of the invention by the foregoing but by the scope of the appended claims.

I claim:
1. A valve operating mechanism for an internal combustion engine comprising:
   automatic lash adjusting means mounted in said engine;
   a rocker arm mounted at one end on said lash adjusting means and providing a fulcrum for pivotal movement thereabout, said rocker arm having a spherical portion on the other end thereof;
   a torsionally elastic member mounted on said engine and operatively connected to said one end of said rocker arm and biasing said rocker arm in one position;
   a camshaft rotatably mounted on said engine and having a cam thereon, said cam being engageable with said rocker arm to apply cyclic motion thereto;
   a valve guide in said engine;
   and a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm.

2. The valve operating mechanism set forth in claim 1 wherein said lash adjusting means includes a plunger reciprocably mounted in said engine, spring means biasing said plunger outwardly, and fluid under pressure biasing said plunger outwardly in accordance with the pressure thereof.

3. The valve operating mechanism set forth in claim 2 and further including stop means engageable with said engine to limit the opening movement of said valve.

4. A valve operating mechanism for an internal combustion engine comprising:
   automatic lash adjusting means mounted in said engine;
   a rocker arm pivotally at one end on said lash adjusting means;
   a camshaft rotatably mounted on said engine and having a cam thereon, said cam being engageable with said rocker arm to apply cyclic motion thereto;
   a valve mounted in said engine for reciprocating motion along an axis;
   means on the other end of said rocker arm engaging said valve and reciprocating said valve;
   and a torsion spring mounted on said engine and received in said one end of said rocker arm to bias said rocker arm toward an equilibrium position, said torsion spring having at least on leaf-type spring having a rectangular cross sectional configuration.

5. The valve operating mechanism set forth in claim 4 wherein said torsion spring is slidable relative to at least one of said engine or said rocker arm.

6. The valve operating mechanism set forth in claim 4 wherein said torsion spring is slidably mounted in said rocker arm.

7. A valve operating mechanism for an internal combustion engine having a cylinder head and comprising:
   an automatic lash adjusting means mounted in said cylinder head and including a spring biased plunger having a spherical seat in the outer end thereof;
   a rocker arm having a spherical surface on one end thereof received in said spherical seat on said lash adjusting means and pivotal thereabout, the other end of said rocker arm terminating in a spherical enlargement;
   a valve reciprocably mounted in said cylinder head for movement along an axis, said valve having a transverse bore in the outer end thereof receiving said spherical enlargement on said other end of said rocker arm and permitting pivotal and sliding movement of said enlargement therein;

a camshaft mounted on said cylinder head and having a cam thereon engaging said rocker arm and rotatable to impart cyclic motion to said rocker arm and reciprocate said valve between a valve open position and a valve closed position;

and a torsion spring mounted at one end on said cylinder head and received at the other end in said one end of said rocker arm, said spring being rectangular in cross section and torsionally resilient about the axis thereof and biasing said rocker arm toward an equilibrium position.

8. The mechanism set forth in claim 7 and further including a bushing received in said opening in said body, said bushing having an inner spherical surface receiving and engaging said spherical portion on said other end of said lever.

9. The valve operating mechanism set forth in claim 7 wherein the intermediate portion of said valve stem is hollow.

10. The valve operating mechanism set forth in claim 7 wherein the portion of said valve stem adjacent said head is of decreased diameter to permit optimum air flow therepast.

11. The valve operating mechanism set forth in claim 7 wherein said opening lies closely adjacent the outer end of said valve guide when said valve is in the maximum open position to reduce the overhang of friction forces within said opening and said valve guide.

12. The valve operating mechanism set forth in claim 7 and further including stop means engageable with said engine to limit the opening movement of said valve.

13. The valve operating mechanism set forth in claim 7 and further including means supporting said one end of said rocker arm on said lash adjusting means by a supporting force greater than the reaction force on said torsionally elastic member at the valve closed position.

14. The valve operating mechanism set forth in claim 13 wherein at least part of said supporting force is supplied by said torsionally elastic member.

15. The valve operating mechanism set forth in claim 13 wherein at least part of said supporting force is applied by said lash adjusting means.

16. The valve operating mechanism set forth in claim 7 wherein said torsion spring is slidable relative to at least one of said engine or said rocker arm.

17. The valve operating mechanism set forth in claim 7 wherein said torsion spring is slidably mounted in said rocker arm.

18. A valve operating mechanism for an internal combustion engine comprising:

a rocker arm pivotally mounted at one end of said engine and having a spherical portion on the other end thereof;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

a valve mounted in said valve guide for reciprocating motion along an axis, said valve having an enlarged head at one end and a cylindrical stem extending therefrom, the end of said stem opposite from said head having a transverse opening therein receiving said spherical portion on said other end of said lever and permitting rocking and sliding movement of said rocker arm relative to said valve, said valve being reciprocated between a valve open and a valve closed position by said cyclic motion of said rocker arm;

and stops means engageable with said engine to limit the opening movement of said valve.

19. The valve operating mechanism set forth in claim 18 wherein said stop means are located on said rocker arm.

20. The valve operating mechanism set forth in claim 18 wherein said stop means are located on said valve stem.

21. The valve operating mechanism set forth in claim 19 wherein said stop means includes a pad on said rocker arm and a pad on said engine, said pads being engaged at the maximum admissible opening of said valve.

22. The valve operating mechanism set forth in claim 20 wherein said stop means includes an annular ring mounted on said valve stem and engageable with said valve guide at maximum admissible opening of said valve.

23. A valve operating mechanism for an internal combustion engine comprising:

automatic lash adjusting means mounted in said engine, said means including a plunger reciprocably mounted in said engine and spring means biasing said plunger outwardly and fluid under pressure biasing said plunger outwardly in accordance with the pressure of said fluid;

a rocker arm mounted at one end on said lash adjusting means and providing a fulcrum for pivotal movement thereabout, said rocker arm having a spherical portion on the other end thereof, and said rocker arm having inertia forces thereon resolvable into a resultant inertia force acting in a line adjacent said spherical portion;

a torsionally elastic member mounted on said engine and operatively connected to said one end of said rocker arm and biasing said rocker arm in one position;

a camshaft rotatably mounted on said engine having a cam thereon, said cam being engageable with said rocker arm to apply cyclic motion thereto;

a valve guide in said engine;

a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

and stop means on said rocker arms engageable with said engine to limit the opening movement of said valve, said stop means being located between the line of action of said resultant intertia force and said camshaft to reduce the fluid pressure in said lash adjusting means.

24. A valve operating mechanism for an internal combustion engine comprising:

automatic lash adjusting means mounted in said engine, said means including a plunger reciprocably mounted in said engine and spring means biasing said plunger outwardly and fluid under pressure biasing said plunger outwardly in accordance with the pressure of said fluid;

a rocker arm mounted at one end on said lash adjusting means and providing a fulcrum for pivotal movement thereabout, said rocker arm having a spherical portion on the other end thereof, and said rocker arm having inertia forces thereon resolvable into a resultant inertia force acting in a line adjacent said spherical portion;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

and stop means on said rocker arm engageable with said engine to limit the opening movement of said valve, said stop means being located in substantial alignment with the line of action of said resultant inertia force on said rocker arm to maintain a substantially positive and constant fluid pressure in said lash adjusting means during maximum opening of said valve.

25. A valve operating mechanism for an internal combustion engine comprising:

automatic lash adjusting means mounted in said engine, said means including a plunger reciprocably mounted in said engine and spring means biasing said plunger outwardly and fluid under pressure biasing said plunger outwardly in accordance with the pressure of said fluid;

a rocker arm mounted at one end on said lash adjusting means and providing a fulcrum for pivotal movement thereabout, said rocker arm having a spherical portion on the other end thereof, and said rocker arm having inertia forces thereon resolvable into a resultant inertia force acting in a line adjacent said spherical portion;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

and stop means on said rocker arm engageable with said engine to limit the opening movement of said valve, said stop means being located on the opposite side of the line of action of said resultant inertia force from said camshaft to increase the fluid pressure in said lash adjusting means during maximum opening of said valve.

26. A valve operating mechanism for an internal combustion engine comprising:

automatic lash adjusting means mounted in said engine, said means including a plunger reciprocably mounted in said engine and spring means biasing said plunger outwardly and fluid under pressure biasing said plunger outwardly in accordance with the pressure of said fluid;

a rocker arm mounted at one end on said lash adjusting means and providing a fulcrum for pivotal movement thereabout, said rocker arm having a spherical portion on the other end thereof;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

and a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

the fluid pressure of said fluid in said lash adjusting means being always positive when said valve is open and the minimum amount of pressure being no less than ten percent of the maximum pressure at maximum acceleration of said valve.

27. A valve operating mechanism for an internal combustion engine comprising:

automatic lash adjusting means mounted in said engine, said means including a plunger reciprocably mounted in said engine and spring means biasing said plunger outwardly and fluid under pressure biasing said plunger outwardly in accordance with the pressure of said fluid;

a rocker arm mounted at one end on said lash adjusting means and providing a fulcrum for pivotal movement thereabout, said rocker arm having a spherical portion on the other end thereof;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

and a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

the fluid pressure of said fluid in said lash adjusting means being always positive when said valve is open and the pressure substantially progressively reduces from a maximum at maximum acceleration of said valve to a minimum at the maximum deceleration of said valve.

28. A valve operating mechanism for an internal combustion engine comprising:

automatic lash adjusting means mounted in said engine, said means including a plunger reciprocably mounted in said engine and spring means biasing said plunger outwardly and fluid under pressure biasing said plunger outwardly in accordance with the pressure of said fluid;

a rocker arm mounted at one end on said lash adjusting means and providing a fulcrum for pivotal movement thereabout, said rocker arm having a spherical portion on the other end thereof;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

and stop means on said rocker arm engageable with said engine and operable to cause the fluid pressure in said lash adjusting means to become negative and cause an amount of pump-up in said lash adjusting means to unseat said valve and reduce engine speed.

29. A valve operating mechanism for an internal combustion engine comprising:

automatic lash adjusting means mounted in said engine;

a rocker arm mounted at one end on said lash adjusting means and providing a fulcrum for pivotal movement thereabout, said rocker arm having a spherical portion on the other end thereof;

a torsionally elastic member mounted on said engine and operatively connected to said one end of said rocker arm and biasing said rocker arm in one position;

a camshaft rotatably mounted on said engine and having a cam thereon, said cam being engageable with said rocker arm to apply cyclic motion thereto;

a valve guide in said engine;

a valve mounted in said valve guide for reciprocating motion along an axis and having an opening therein, said opening receiving said spherical portion on said other end of said rocker arm and said valve being reciprocated between a valve open position and a valve closed position by said cyclic motion of said rocker arm;

and means supporting said one end of said rocker arm on said lash adjusting means by a force greater than the reaction force on said torsionally elastic member at the valve closed position.

30. The valve operating mechanism set forth in claim 29 wherein at least part of said supporting force is applied by said torsionally elastic member.

31. The valve operating member set forth in claim 29 wherein at least part of said supporting force is applied by said lash adjusting means.

References Cited by the Examiner

UNITED STATES PATENTS

| | | | |
|---|---|---|---|
| 2,058,242 | 10/1936 | Lee | 123—90 |
| 2,404,827 | 7/1946 | Chilton | 123—90 |
| 2,763,250 | 9/1956 | Bensinger et al. | 123—90 |
| 3,103,829 | 9/1963 | Basford | 74—559 |

FOREIGN PATENTS

| | | |
|---|---|---|
| 663,570 | 5/1963 | Canada. |
| 1,120,804 | 12/1961 | Germany. |
| 122,180 | 3/1920 | Great Britain. |
| 511,272 | 8/1939 | Great Britain. |
| 610,669 | 10/1948 | Great Britain. |

FRED E. ENGELTHALER, *Primary Examiner.*

RICHARD B. WILKINSON, *Examiner.*

UNITED STATES PATENT OFFICE
CERTIFICATE OF CORRECTION

Patent No. 3,217,699 November 16, 1965

John Dolza

It is hereby certified that error appears in the above numbered patent requiring correction and that the said Letters Patent should read as corrected below.

Column 8, line 43, after "pivotally" insert -- mounted --; line 55, for "on" read -- one --; column 10, line 1, for "stops" read -- stop --.

Signed and sealed this 27th day of September 1966.

(SEAL)
Attest:

ERNEST W. SWIDER
Attesting Officer

EDWARD J. BRENNER
Commissioner of Patents